United States Patent
Frank et al.

(10) Patent No.: US 10,024,564 B2
(45) Date of Patent: Jul. 17, 2018

(54) THERMOSTAT ECO-MODE

(71) Applicant: Opower, Inc., Arlington, VA (US)

(72) Inventors: Ilan Frank, Los Altos, CA (US);
Daniel McCool, San Francisco, CA (US); Tom Darci, Oakland, CA (US)

(73) Assignee: OPOWER, INC., Arlington, VA (US)

( * ) Notice: Subject to any disclaimer, the term of this patent is extended or adjusted under 35 U.S.C. 154(b) by 325 days.

(21) Appl. No.: 14/566,469

(22) Filed: Dec. 10, 2014

(65) Prior Publication Data

US 2016/0018832 A1     Jan. 21, 2016

Related U.S. Application Data

(60) Provisional application No. 62/024,893, filed on Jul. 15, 2014.

(51) Int. Cl.
*G05B 13/00*     (2006.01)
*G05B 15/00*     (2006.01)
(Continued)

(52) U.S. Cl.
CPC ............ *F24F 11/006* (2013.01); *F24F 11/30* (2018.01); *F24F 11/62* (2018.01); *G05B 15/02* (2013.01);
(Continued)

(58) Field of Classification Search
CPC ... F24F 11/006; G05B 15/02; G05D 23/1902; G05D 23/1905; G05D 23/1917
(Continued)

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.
(Continued)

*Primary Examiner* — Robert Cassity
(74) *Attorney, Agent, or Firm* — Cooper Legal Group, LLC

(57) ABSTRACT

In some aspects, the subject technology relates to an "Eco-mode" on a thermostat. A button or other user interface element may be configured to activate and/or deactivate) the eco-mode on the thermostat. Upon selection of the eco-mode option, various energy-saving programs can be implemented on the thermostat. The energy-saving programs can be configured to adjust a temperature setting of the thermostat or to provide notifications to a user associated with the thermostat that implement various approaches for reducing energy consumption of a heating, ventilation, and air condition (HVAC) system associated with the thermostat. The eco-mode button can provide users/consumers with a convenient way to save energy, without requiring the user to think of comfort tradeoffs that may need to take place.

22 Claims, 11 Drawing Sheets

(51) Int. Cl.
*F24F 11/00* (2018.01)
*H04W 4/021* (2018.01)
*G05B 15/02* (2006.01)
*G05D 23/19* (2006.01)
*F24F 11/30* (2018.01)
*F24F 11/62* (2018.01)
*F24F 140/50* (2018.01)
*F24F 140/60* (2018.01)
*F24F 120/20* (2018.01)
*F24F 130/00* (2018.01)
*F24F 130/10* (2018.01)
*F24F 11/63* (2018.01)
*F24F 11/64* (2018.01)
*F24F 11/65* (2018.01)
*F24F 11/56* (2018.01)
*F24F 11/46* (2018.01)
*F24F 11/52* (2018.01)
*F24F 11/47* (2018.01)

(52) U.S. Cl.
CPC ..... *G05D 23/1902* (2013.01); *G05D 23/1905* (2013.01); *G05D 23/1917* (2013.01); *H04W 4/021* (2013.01); *F24F 11/46* (2018.01); *F24F 11/47* (2018.01); *F24F 11/52* (2018.01); *F24F 11/56* (2018.01); *F24F 11/63* (2018.01); *F24F 11/64* (2018.01); *F24F 11/65* (2018.01); *F24F 2120/20* (2018.01); *F24F 2130/00* (2018.01); *F24F 2130/10* (2018.01); *F24F 2140/50* (2018.01); *F24F 2140/60* (2018.01); *Y02D 70/00* (2018.01); *Y02D 70/142* (2018.01); *Y02D 70/144* (2018.01); *Y02D 70/164* (2018.01); *Y02D 70/166* (2018.01)

(58) Field of Classification Search
USPC .................................................. 700/275, 276
See application file for complete search history.

(56) References Cited

U.S. PATENT DOCUMENTS

| | | |
|---|---|---|
| 5,513,519 A | 5/1996 | Cauger et al. |
| 5,555,927 A * | 9/1996 | Shah .................. G05D 23/1904 165/239 |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| 7,991,513 B2 | 8/2011 | Pitt |
| 8,065,098 B2 | 11/2011 | Gautam |
| 8,166,047 B1 | 4/2012 | Cohen et al. |
| 8,180,591 B2 | 5/2012 | Yuen et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| 8,583,288 B1 | 11/2013 | Rossi et al. |
| 8,630,741 B1 | 1/2014 | Matsuoka et al. |
| 8,660,813 B2 | 2/2014 | Curtis et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| D714,335 S | 9/2014 | Cojuangco et al. |
| D729,268 S | 5/2015 | Nies et al. |
| 9,031,703 B2 | 5/2015 | Nakamura et al. |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0167535 A1 | 7/2008 | Stivoric et al. |
| 2008/0195561 A1 | 8/2008 | Herzig |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |

(56) References Cited

U.S. PATENT DOCUMENTS

| | | | |
|---|---|---|---|
| 2010/0286937 A1 | 11/2010 | Hedley et al. | |
| 2010/0289643 A1* | 11/2010 | Trundle | F24F 11/0086 |
| | | | 340/545.1 |
| 2010/0324962 A1 | 12/2010 | Nesler et al. | |
| 2010/0332373 A1 | 12/2010 | Crabtree et al. | |
| 2011/0022429 A1 | 1/2011 | Yates et al. | |
| 2011/0023045 A1 | 1/2011 | Yates et al. | |
| 2011/0040666 A1 | 2/2011 | Crabtree et al. | |
| 2011/0046792 A1* | 2/2011 | Imes | H04L 67/42 |
| | | | 700/278 |
| 2011/0061014 A1 | 3/2011 | Frader-Thompson et al. | |
| 2011/0063126 A1 | 3/2011 | Kennedy et al. | |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0178842 A1 | 7/2011 | Rane et al. | |
| 2011/0178937 A1 | 7/2011 | Bowman | |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0064923 A1 | 3/2012 | Imes et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2013/0060531 A1 | 3/2013 | Burke et al. | |
| 2013/0060720 A1 | 3/2013 | Burke | |
| 2013/0097481 A1 | 4/2013 | Kotler et al. | |
| 2013/0173064 A1 | 7/2013 | Fadell et al. | |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2013/0331087 A1* | 12/2013 | Shoemaker | H04L 67/125 |
| | | | 455/420 |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0337107 A1 | 11/2014 | Foster | |
| 2014/0370911 A1 | 12/2014 | Gorgenyi et al. | |
| 2015/0140994 A1 | 5/2015 | Partheesh et al. | |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0324819 A1 | 11/2015 | Lin et al. | |
| 2015/0326679 A1 | 11/2015 | Lin et al. | |
| 2016/0223998 A1* | 8/2016 | Songkakul | G05B 15/02 |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://www.web.archive.org/web/20080708193253/http://www.nature.org/initiatives/climatechange/calculator/2008.

Author Unknown, "CoolClimate Calculator," May, 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.naure.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Chen, Hanfeng, et al., "Testing for a Finite Mixture Model With Two Components," Journal of the Royal Statistical Society, Series B, vol. 66, No. 1, 26 pages, 2004.

(56) References Cited

OTHER PUBLICATIONS

De Prensa, Boletine, "Txu Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting—Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it/works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
NEST, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
Non-Final Office Action in co-pending U.S. Appl. No. 14/457,809, filed Dec. 11, 2014, dated Apr. 13, 2017 (17 pgs.).
Non-Final Office Action in co-pending U.S. Appl. No. 14/457,809, filed Dec. 11, 2014, dated Sep. 25, 2017 (15 pgs.).
Non-Final Office Action in co-pending U.S. Appl. No. 14/457,809, filed Dec. 11, 2014, dated Jan. 9, 2018 (18 pgs.).

* cited by examiner

THERMOSTAT ECO-MODE

CROSS-REFERENCE TO RELATED APPLICATIONS

The present application claims the benefit of priority to U.S. Provisional Application Ser. No. 62/024,893, filed Jul. 15, 2014, titled "THERMOSTAT ECO-MODE," of which is hereby incorporated by reference in its entirety.

BACKGROUND

Consumers seeking to reduce their energy consumption may face various difficulties when configuring their heating, ventilation, and air conditioning (HVAC) systems for energy-efficient use. For example, a thermostat may be configured to operate based on a number of different settings or programs. Having to manually configure these settings or programs can be cumbersome for the user. In some instances, thermostats can learn a user's behavior and configure some of these settings or programs automatically. However, such approaches may not determine the best settings or programs for configuring the thermostat for energy efficient use, since the patterns of the user, from which the thermostat learns, may not be the best examples of energy efficient operation.

BRIEF DESCRIPTION OF THE DRAWINGS

In the following description, reference is made to the following figures, and in which are shown by way of illustration specific embodiments in which the subject technology may be practiced. Other embodiments may be utilized and changes may be made without departing from the scope of the subject technology.

DETAILED DESCRIPTION

Figure 1:
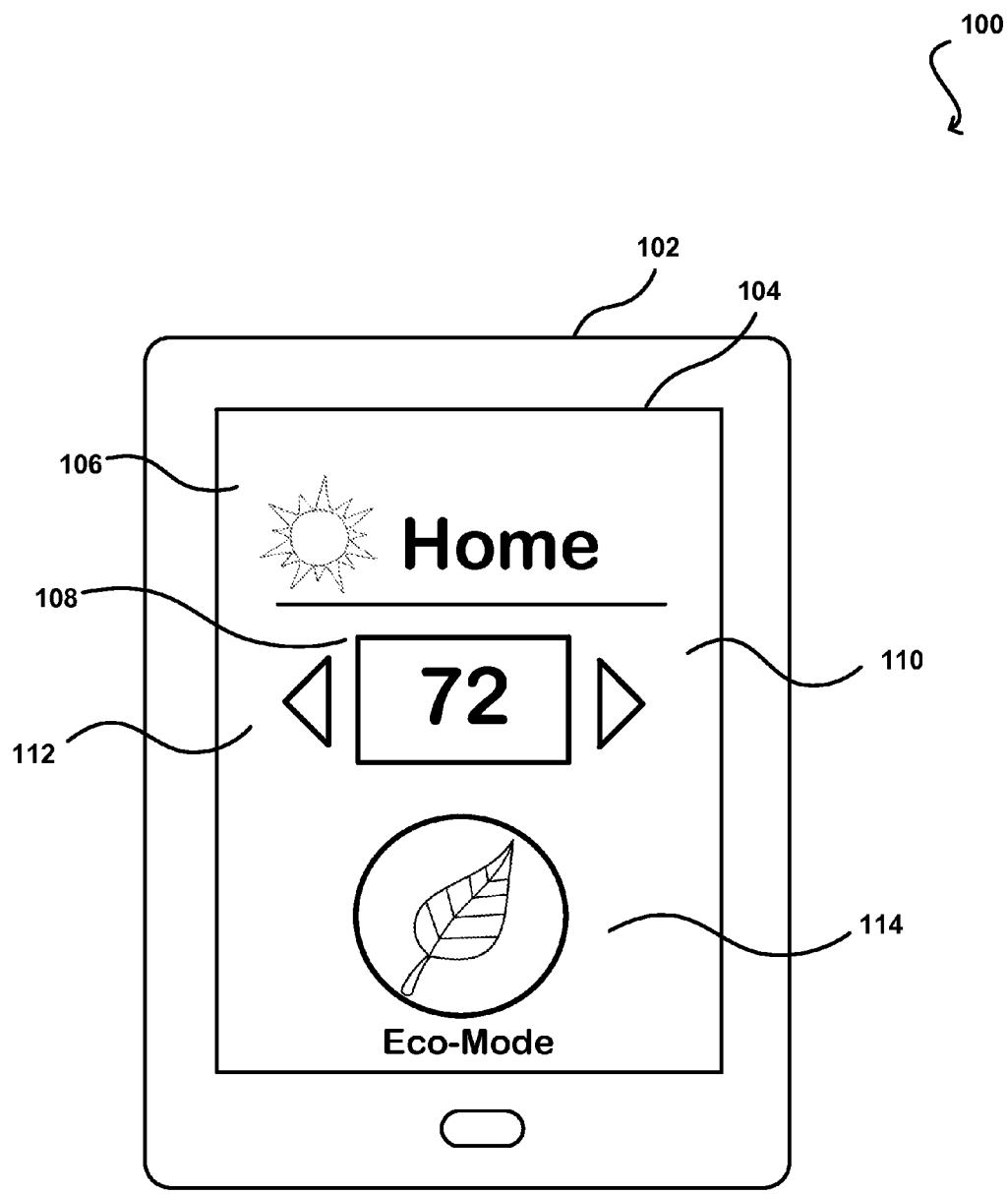
FIG. 1 illustrates an example interface that provides an eco-mode button in accordance with various embodiments.

Various embodiments of the disclosure are discussed in detail below. While specific implementations are discussed, it should be understood that this is done for purposes of illustration. A person skilled in the relevant art will recognize that other components and configurations may be used without parting from the spirit and scope of the disclosure.

Thermostats (e.g., controllers, smart thermostats, etc.) can be used to control heating, ventilation, and air conditioning (HVAC) systems for the purposes of regulating temperatures, for example, in one's home or business. Some thermostats allow users to set schedules to control the temperature of a property for various periods of time. For example, a user can set a schedule that disables heating in the user's home during the day and sets the thermostat at a temperature of 72 degrees starting at 6:30 pm. Such programmable thermostats may result in higher energy consumption due to inefficient programming or setting selection by users. In some instances, thermostat information or settings may be accessed and/or modified through networked devices (e.g., Internet-connected devices) such as mobile phones or tablets. In another approach, some thermostats are able to automatically learn preferred temperature settings for a property, when the property is likely to be occupied, and when the property is likely to be empty. Such information can be utilized by the thermostat to automatically pre-heat or pre-cool the property prior to the resident's arrival so that the property is at a comfortable temperature when the resident arrives.

Systems and methods in accordance with various embodiments of the present disclosure overcome one or more of the above-referenced deficiencies and other deficiencies in conventional approaches to configuring their heating, ventilation, and air conditioning (HVAC) systems for energy-efficient use. In particular, various embodiments of the present disclosure can be utilized to implement various energy-saving programs and/or settings for a thermostat. In some embodiments, the energy-saving programs and/or settings are activated upon selection of an "eco-mode" button. In various embodiments, the eco-mode button may be implemented through a web-based thermostat application that is accessible through a web browser, a thermostat software application that runs on a computing device, and/or on the thermostat itself (e.g., as a physical button, a graphical representation of a button, or other eco-mode activation interface). The eco-mode button allows users to toggle between operating the thermostat in a normal mode and, as mentioned, an efficient mode that activates one or more energy-saving programs and/or settings on the thermostat. As used herein, a "normal mode" of the thermostat can refer to any of the convention approaches for operating thermostats including, for example, regulating thermostats using programmable schedules or through learned patterns. Thus, the eco-mode button can provide users or consumers with a convenient way to save more energy, without requiring the user to think of any comfort tradeoffs that may need to take place.

Various approaches described herein can be implemented using a server or computing device having at least one processor and memory for storing instructions that, when executed by the processor, cause the server or computing device to perform operations. As used herein, the term "property" described herein can include components of the property (e.g., a house, place of business, point of interest, etc.) that are able to consume a commodity. One example of a component of a property may be a heating, ventilation and air conditioning (HVAC) system that controls the climate within the property using electricity, natural gas, and/or another commodity. The component may relate to one or more of a central heating device, a central air conditioning and heating system, an appliance, an electronic device, water heating system, a power generating device, a ventilation system, or an air filtration system.

FIG. 1 illustrates an example 100 interface 104 that includes an eco-mode button 114 in accordance with various embodiments. The interface 104 may be displayed on a display screen of a computing device 102.

Figure 2:
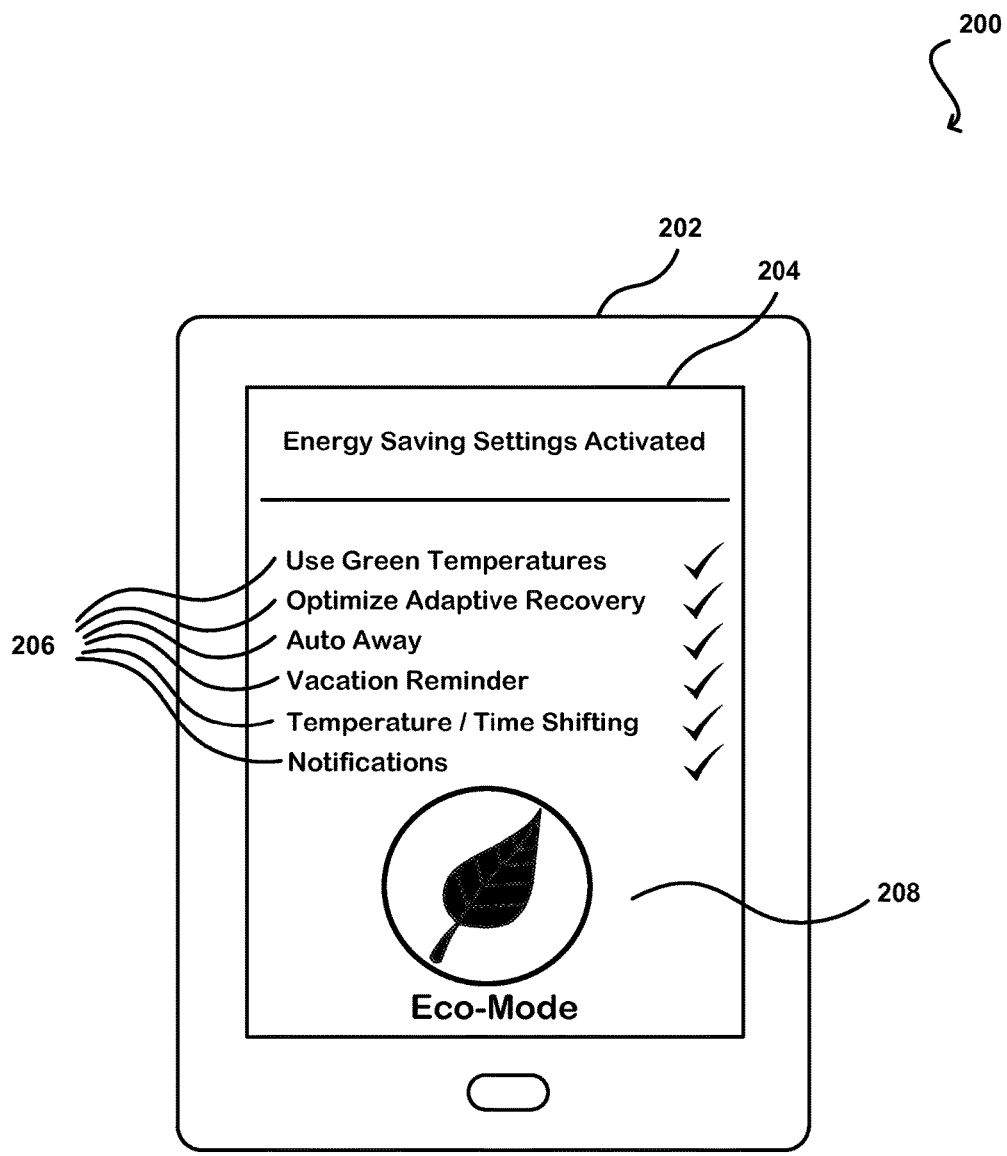
FIG. 2 illustrates an example interface that provides an example listing of energy-saving programs that are activated upon selecting the eco-mode button in accordance with various embodiments.

In various embodiments, a user can access and/or control thermostat settings through the interface 104. For example, the user can login into a portal or web interface using credentials to access the interface 104. Similarly, the user can access the interface 104 through an executable software application that is running on the computing device 102. Using the interface 104, the user can view temperature settings 108 for a thermostat that is associated with the user's property 106 (e.g., "home"). The user can also select options to increase 110 or decrease 112 the temperature setting 108 without having to interact directly with the thermostat itself. In various embodiments, the interface 104 includes an eco-mode button 114, which, when selected, is configured to initiate various energy-saving programs and/or settings on the thermostat, as illustrated in the example of FIG. 2. Although various embodiments discuss a graphical eco-mode button appearing on an interface on any computing device, in other embodiments, the eco-mode button may be located on the thermostat itself, for example, as a graphical interface element or a physical button.

FIG. 2 illustrates an example 200 of an interface 204 that provides an example listing of energy-saving programs 206 that are activated upon selecting the eco-mode button 208 in accordance with various embodiments. The interface 204 may be displayed on a display screen of a computing device 202. A user can access the interface 204 through a portal, web interface, or an executable software application that is running on the computing device 202, for example, by providing appropriate credentials. The interface 204 allows the user to control one or more thermostats associated with the user's property, as described in FIG. 1.

In some embodiments, selecting the eco-mode button 208 activates one or more energy-saving programs that are configured to reduce the amount of energy consumed by the user's HVAC system for the property. One example energy-saving program configures the thermostat for the user's property to automatically maintain energy-efficient temperatures in that property. For example, such energy-efficient temperature data may be specified by the government, a utility company, an energy management organization, or other third party.

In some embodiments, efficient temperatures may be determined based on the thermostat settings (e.g., set points) of nearby users. For example, efficient temperatures may be determined by identifying users that are located in the same geographic region (e.g., neighborhood, city, state, zip code, within a certain proximity threshold of the user, etc.) as the user, retrieving thermostat set point temperatures used by those identified users, and calculating the efficient temperature(s) based on the retrieved thermostat set point temperatures. Efficient temperatures may be, for example, set point temperatures in the 25$^{th}$ percentile of most efficient set point temperatures (or some other threshold) for users in the geographic region. In another variation, efficient temperatures may be determined by identifying users that are located in the same geographic region, selecting energy efficient users from the identified users based on their respective energy usages and/or thermostat set point temperatures, and calculating the efficient temperature(s) based on the retrieved thermostat set point temperatures for the efficient users. Energy efficient users, for example, may be users in the geographic region that satisfy an energy efficiency criteria with respect to other users in the geographic region (e.g., users that use less than 80% of the average energy usage for users in the geographic area or users in the 25$^{th}$ percentile of most efficient users) or a thermostat set point temperature criteria with respect to other users in the geographic region (e.g., users with more efficient set point temperatures than average). The calculated efficient temperature(s) may be based on the average set point temperature for efficient users. In some embodiments, efficient temperatures may be set based on weather trends. For example, if outdoor heating is expected to exceed an indoor temperature set point within a period of time (e.g., one hour), then the HVAC system is configured to run the heat for a reduced period of time (e.g., 15 minutes). Such weather trends may be predicted based on past weather data for a given geographic region. In some embodiments, efficient temperatures may be set based on an expected or upcoming changes to a schedule set on the thermostat. For example, if the thermostat is expected to be set to an away mode at a certain amount of time (e.g., 30 minutes), then the thermostat can be disabled prior to such change (e.g., 30 minutes before the change is expected to occur).

The user can also specify a minimum temperature and/or a maximum temperature that override any energy-efficient temperatures. For example, the user can specify a minimum temperature of 65 degrees and a maximum temperature of 72 degrees. In this example, the user's HVAC system will not let the temperature of the property drop below 65 degrees or exceed 72 degrees. Additionally or alternatively, efficient temperatures may be determined based on runtime efficiency calculations.

Another example energy-saving program enables or disables certain programs or schedules set on the thermostat. For example, in some implementations, if the thermostat is configured to utilize an adaptive recovery program, such a program can be disabled by the energy-saving program. Generally, an adaptive recovery program activates or deactivates an HVAC system (e.g., pre-cools or pre-heats) for a property at some time so that the property is at a specified temperature, for example, by a scheduled time or by a time a user arrives at the property. For example, if the temperature at the property is 78 degrees and a thermostat for the property has a set point of 72 degrees scheduled for 5:00 pm, then the thermostat may initiate cooling at 3:30 pm so that the temperature of the room is 72 degrees by 5:00 pm.

In some implementations, the energy-saving program activates a more energy-efficient adaptive recovery program. For example, rather than activating adaptive recovery so that the property is at a specified temperature by a schedule time, a determination can be made to whether any residents of the property are in or within a threshold distance of the property. If no residents are in or within a threshold distance of the property, then the activation of adaptive recovery can be delayed until at least one resident is within the threshold distance of the property. In some implementations, prior to activating adaptive recovery, the user can be provided a notification, for example, through the software application running on the computing device 202, asking the user to confirm whether to activate the adaptive recovery program. Such a notification may also include an expected cost for utilizing the adaptive recovery program. For example, if the user has a trunk thermostat, then user can be notified of the expected cost for activating adaptive recovery and be provided with an option to disable the adaptive recovery program either through the interface 204 or instructions for manually disabling the adaptive recovery program through the thermostat.

Another example energy-saving program is configured to optimize an away feature on the thermostat that automatically sets the thermostat to an energy-efficient temperature, for example, when no residents are in or within a threshold distance of the property. In various embodiments, the away feature is optimized by determining a geo-fence around the user's property. Depending on the implementation, the geo-fence may be determined, for example, based on a radius around the user's property or using a set of boundaries that encompass the user's property. Further, the user can enroll or associate any number of computing devices (e.g., mobile phones, tablets, etc.) to be associated with the user's property, as described below. Each device can be configured to send a notification at any time the device exits the geo-fence defined for the user's property. In such implementations, the thermostat or an energy management system, as described below, can be configured to determine whether any enrolled devices are still located within the geo-fence. When no enrolled devices are determined to be located within the geo-fence, the away feature is triggered on the thermostat so that the thermostat automatically sets the temperature to an energy-efficient temperature. The geo-fence can be determined based on a default distance (e.g., one mile) or some distance specified by the user (e.g., 500 feet, five miles, etc.).

Further, in some embodiments, different geo-fences can be utilized to signal different actions by the user. For example, a first geo-fence having a distance radius of one mile can be utilized for determining when the user is leaving the property. That is, the user is determined to have left the property once the user is located at a distance that is at least one mile away from the property. Further, a second geo-fence having a distance radius of half of a mile can be utilized for determining when the user is returning to the property. That is, the user is determined to be returning (or has returned) to the property when the user is located at a distance that is a half of a mile or less from the property.

Another example energy-saving program performs energy saving operations upon determining that the user is on vacation. If the user is on vacation, then the thermostat can automatically disable any schedules set by the user and instead set the thermostat to an energy-efficient temperature, a different temperature specified by the user (e.g., through a web interface or a software-based interface), or can disable the thermostat completely. When the user returns to the property from vacation, the energy-saving program will automatically resume any schedules set by the user so that the property is at a comfortable temperature when the user arrives. In various embodiments, such an energy-saving program can be triggered upon determining that any devices associated (e.g., enrolled) with the property, as described above, are located at or beyond a threshold distance from the property. As mentioned, such distances can be determined using geo-fences and different geo-fences can be specified to signal different actions by the user. For example, a first geo-fence having a distance radius of 100 miles can be utilized for determining when the user is far enough away from the property such that the user is likely on vacation. That is, the user is determined to have left the property once the user is located at a distance that is at least 100 miles away from the property. Alternatively or additionally, the amount of time a user is outside of a geo-fence may be used to determine if the user is on vacation. For example, whether the user is outside of a geo-fence for a threshold period of time (e.g., 2 days or 36 hours) without returning may be used to determine whether the user is likely on vacation.

Figure 3:
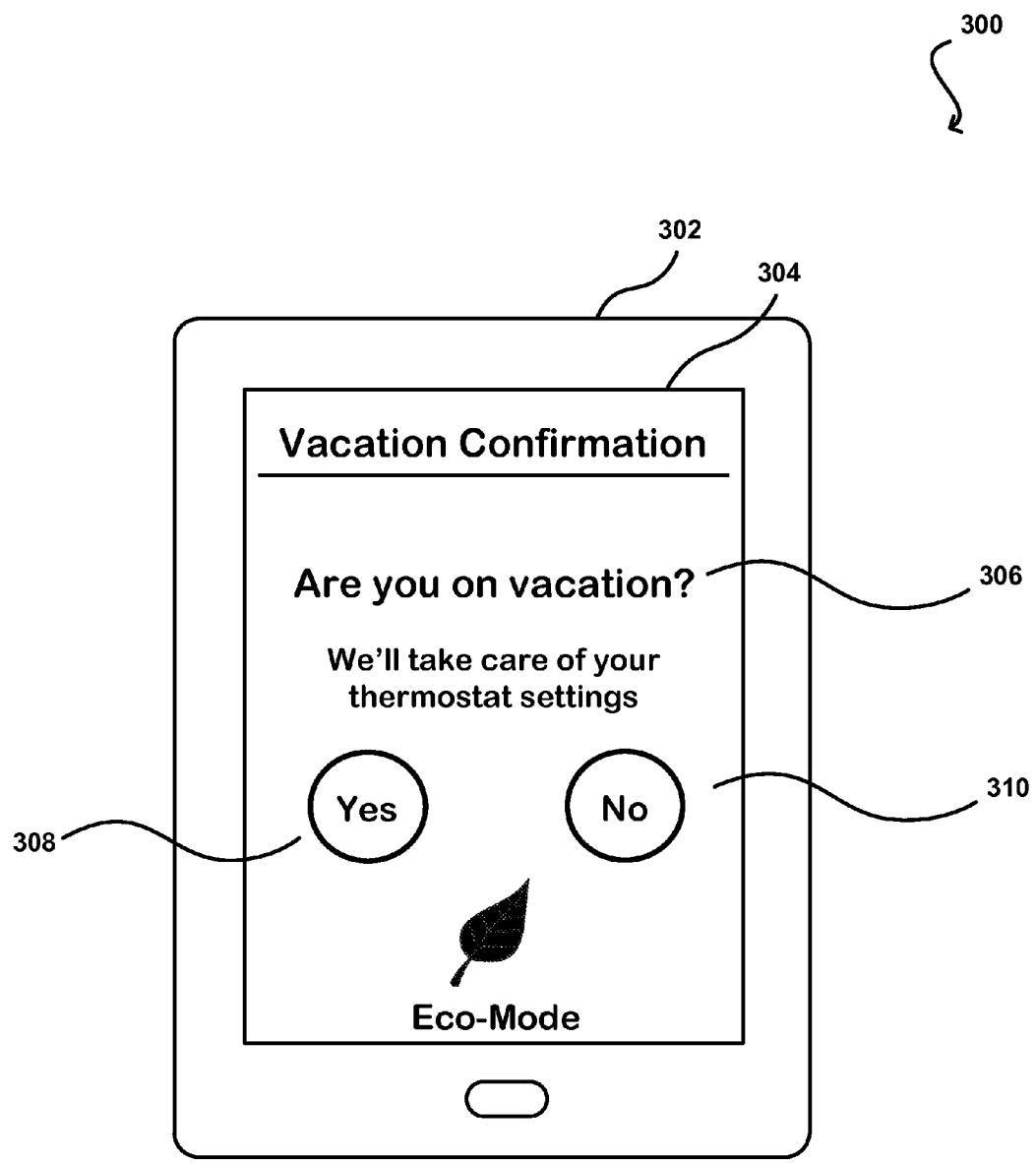
FIG. 3 illustrates an example of an interface displaying a notification for confirming whether a user is on vacation in accordance with various embodiments.

In some embodiments, once a determination is made that the user is likely on vacation, a confirmation message can be sent to the user's device, for example, in the form of an e-mail or notification through the interface, as described in reference to FIG. 3. The confirmation message can ask the user to confirm whether the user is actually on vacation. If the user confirms that the user is on vacation, then, as mentioned, the thermostat can automatically disable any schedules set by the user and instead set the thermostat to an energy-efficient temperature, a different temperature specified by the user (e.g., through a web interface or a software-based interface), or can disable the thermostat completely. If the user instead confirms that the user is not on vacation, then the thermostat can continue to operate as configured (e.g., run any schedules set by the user).

When the user returns to the property from vacation, the energy-saving program will automatically resume any schedules set by the user so that the property is at a comfortable temperature set by the user. In some embodiments, a determination is made that the user is returning to the property based on the user device entering a second geo-fence. For example, a second geo-fence having a distance radius of 10 miles can be utilized for determining when the user is returning to the property. That is, the user is determined to be returning (or has returned) to the property when the user is located at a distance that is 10 miles or less from the property. Determining whether the user device has crossed (e.g., entered or exited) a geo-fence can be performed using generally known approaches as well as any of the approaches described in this specification. Further, different geo-fences for determining whether the user is leaving the property or returning to the property can be utilized depending on the type of energy-saving program. That is, for example, different geo-fence (e.g., radii or boundaries) may be utilized when determining the user is away or when the user is on vacation.

Another example energy-saving program is configured to determine whether the temperature and/or humidity for the geographic region in which the user's property is located are at levels that would be acceptable to the user as being comfortable. For example, the temperature and/or humidity may be determined to be at acceptable levels if such levels match, or are within a threshold range of, the user's thermostat settings for the property. Thus, if the user's thermostat setting is set to 70 degrees and the temperature outside of the property is 70 degrees, then the temperature may be determined to be at an acceptable level to the user. In such instances, a notification can be sent to the user, for example, through the interface 204, indicating that the temperature and/or humidity outside of the user's property is at acceptable levels and that the user can save energy by deactivating the thermostat and simply opening up any ventilation openings of the property (e.g., windows, doors, etc.) instead. The user can also be provided with an option with the notification which, when selected, will disable the thermostat for the property.

In some implementations, rather than deactivating the thermostat, the user can be provided with an option that will place a temporary hold on the thermostat by setting a temperature setting so that the user's HVAC system will not be activated until the temperature within the property reaches a threshold temperature. For example, the user can open up windows of the property when the outside temperature (e.g., 68 degrees) matches the temperature setting of the thermostat (e.g., 68 degrees). Further, the user can select an option that set the thermostat to a threshold temperature (e.g., 70 degrees) so that the thermostat will automatically activate upon the temperature of the property reaching the threshold temperature. When the threshold temperature is reached, the user can be provided with a notification describing the change in the property's temperature and instructing the user to close any ventilation openings, since the thermostat is now active.

Another example energy-saving program is configured to notify the user of any infractions related to energy usage or efficiency. For example, the user may be notified through the interface 204 that no away schedule (e.g., a schedule defining temperatures for the property when the user is away) has been set for the user's property. In some implementations, the user can be asked to enroll any devices (e.g., mobile phones) of the user that can be used to determine whether the user is or is not present at the property, as described in this specification. In another example, the user may be notified through the interface 204 that an inefficient away schedule has been set. An inefficient away schedule may result when the schedule set by the user does not match the user's activity. For example, the user may set an away schedule specifying that the user will not be at the property between the hours of 10 am to 5 pm. However, the user's detected activity (either by a detector on the thermostat or using any of the techniques described herein) may indicate that the user is not present at the property between the hours of 8 am to 6 pm. In such instances, the user can be notified that the away schedule is inefficient since the user is wasting energy between the hours of 8 am and 10 am and also the hours of 5 pm and 6 pm when the user is not actually at the property. Other possible notifications include informing the user that the thermostat is set or is scheduled to be set to an inefficient temperature. In various embodiments, the user is able to disable any notifications such that the user will no longer receive such notifications, for example, through the interface 204.

Another example energy-saving program is configured to perform adjustments to the user's temperature schedule and/or temperature settings, for example, to help reduce the time it takes to cycle between temperature settings or modes (e.g., away periods, asleep periods, etc.). For example, a user may have an away schedule between the hours of 10 am and 5 pm. In some embodiments, the energy-saving program will activate the away schedule by a default or specified time (e.g., 15 minutes earlier) earlier than the set time of 10 am so that the away schedule will activate at 9:45 am instead. Further, temperature settings can be similarly optimized. In one aspect, temperatures set for away schedules and/or sleep schedules can be adjusted by some specified value (e.g., 1, 2, 3, 4, etc. degrees). For example, during the summer, any temperatures set for an away schedule and/or sleep schedule for the property can be increased by some value, for example, from 67 degrees to 69 degrees, to reduce energy consumption. Similarly, during the winter, any temperatures for an away schedule and/or sleep schedule for the property can be decreased by some value, for example, from 78 degrees to 75 degrees, to reduce energy consumption. In another aspect, temperatures set for periods of the day during which the user is present or temperatures set when the user is returning to the property can be adjusted using a different specified value. For example, any temperatures set for periods of the day during which the user is present or temperatures set when the user is returning to the property can be adjusted by two degrees to help reduce energy consumption. In some embodiments, determining how much to adjust a temperature can be based on the temperature outside of the user's property. For example, if the temperature outside is lower than the temperature setting on the thermostat, then the thermostat temperature can be decreased by some value, as described above. However, if the temperature outside is higher than the temperature setting on the thermostat, then the thermostat temperature can be increased by some value, as described above.

In certain aspects, when the eco-mode button 208 is selected, a green leaf or similar icon is displayed in the interface 204 to indicate that an energy efficient mode of thermostat operation has been activated. In some embodiments, when the eco-mode button 208 has not been selected, various behavioral coaching approaches (e.g., notifications) can be utilized to encourage the user to select the eco-mode button 208.

FIG. 3 illustrates an example 300 of an interface 304 displaying a notification for confirming whether a user is on vacation. The interface 304 may be displayed on a display screen of a computing device 302. The user can access the interface 304 through a portal, web interface, or an executable software application that is running on the computing device 302, for example, by providing appropriate credentials.

As mentioned, in some embodiments, when a determination is made that the user might be on vacation, for example, as a result of the computing device 302 exiting a geo-fence, a confirmation message 306 can be sent to the device 302. For example, the message 306 can be sent in the form of an e-mail to the user or as a notification through the interface 304. The message 306 can include various options 308, 310 that the user can select by interacting with the device 302. For example, the user can select a confirmation option 308 to indicate that the user is indeed on vacation or the user can select an option 310 indicating that the user is not on vacation. If the user confirms that the user is on vacation, then, as mentioned, the thermostat can automatically disable any schedules set by the user and instead set the thermostat to an energy-efficient temperature, a different temperature specified by the user (e.g., through a web or software-based interface), or can disable the thermostat completely. If the user instead confirms that the user is not on vacation, then the thermostat can continue to operate as configured (e.g., run any schedules set by the user).

Figure 4:
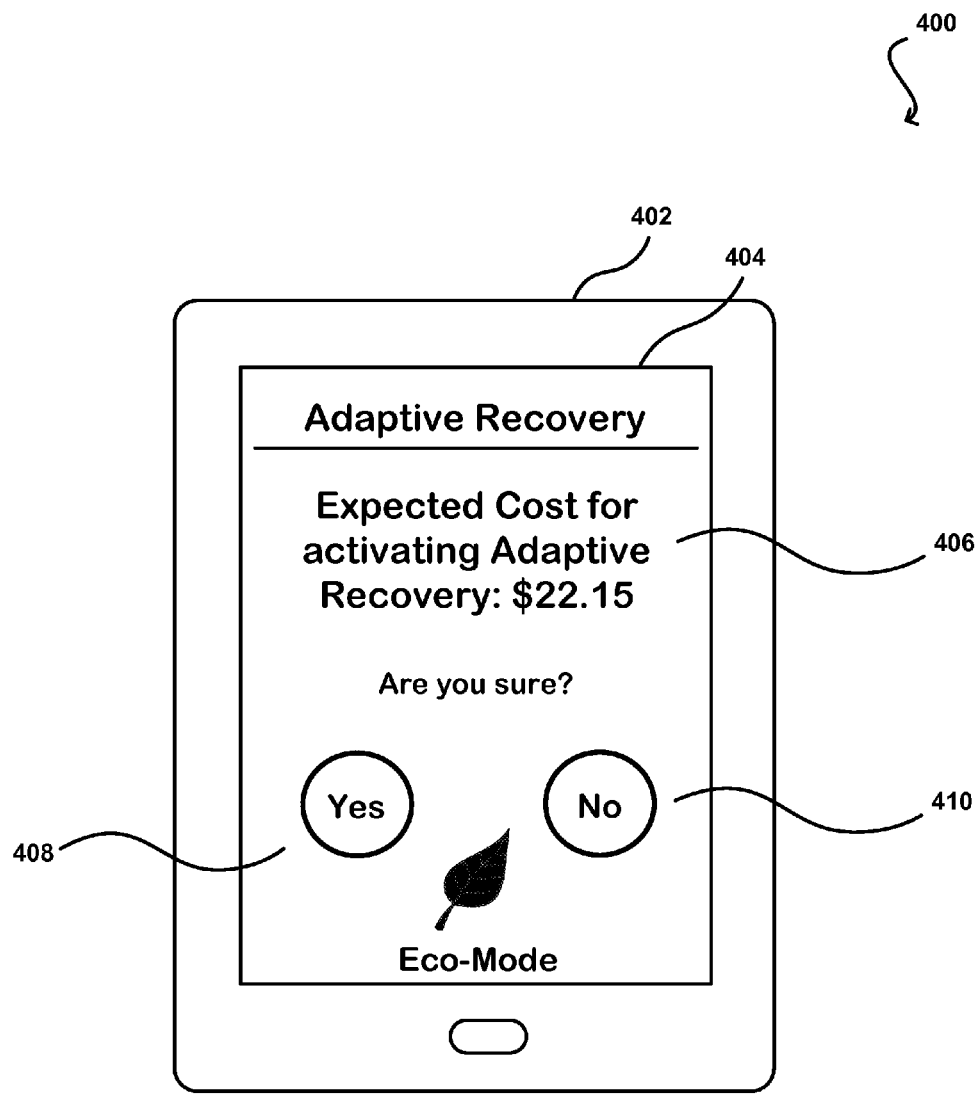
FIG. 4 illustrates an example of an interface displaying a notification seeking user confirmation for whether to activate adaptive recovery in accordance with various embodiments.

FIG. 4 illustrates an example 400 of an interface 404 displaying a notification 406 seeking user confirmation for whether to activate adaptive recovery. The interface 404 may be displayed on a display screen of a computing device 402. The user can access the interface 404 through a portal, web interface, or an executable software application that is running on the computing device 402, for example, by providing appropriate credentials.

As mentioned, in some implementations, prior to activating an adaptive recovery program, the user can be provided a notification 406, for example, through the software application running on the computing device 402, asking the user to confirm whether to activate the adaptive recovery program. For example, the user can be provided with an option 408 to confirm the activation of the adaptive recovery program and an option 410 to disable the active recovery program. In some embodiments, the notification 406 can include an expected cost for utilizing the adaptive recovery program.

Although FIG. 4 shows a notification 406 seeking user confirmation for adaptive recovery activation, in other embodiments, additional or alternative notifications may be provided for additional or alternative energy-saving programs. These notifications may request user confirmation to activate or disable energy-saving programs and include the calculated costs that each action is expected to save or use.

Figure 5A:
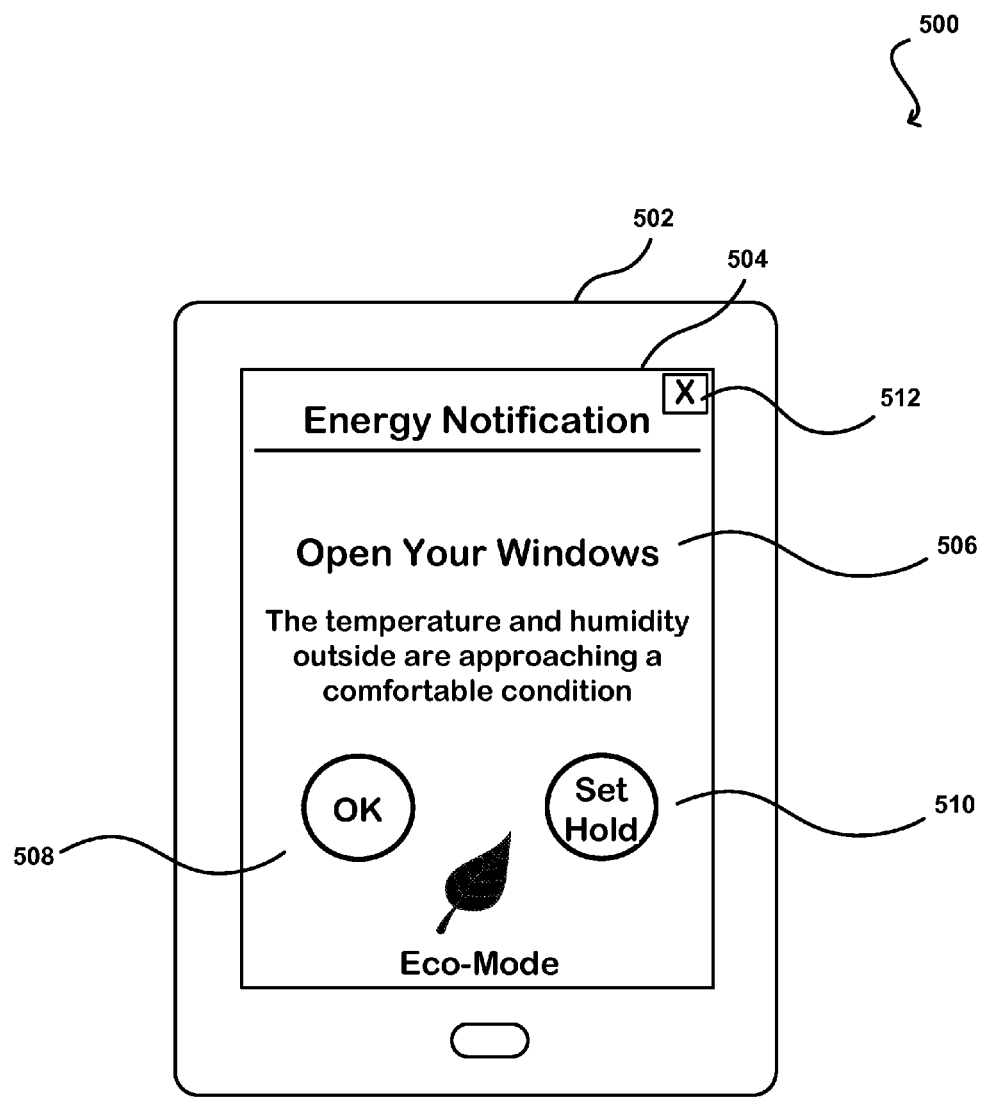
FIGS. 5(*a*)-(*b*) illustrates an example of an interface displaying a notification instructing the user to open any ventilation openings of a property.

FIG. 5(a) illustrates an example 500 of an interface 504 displaying a notification 506 instructing the user to open any ventilation openings of a property instead of utilizing the HVAC system for regulating the temperature of the property. The interface 504 may be displayed on a display screen of a computing device 502. The user can access the interface 504 through a portal, web interface, or an executable software application that is running on the computing device 502, for example, by providing appropriate credentials.

As mentioned, in some embodiments, an energy-saving program can be configured to determine whether the temperature and/or humidity for the geographic region in which the user's property is located are at levels that would be acceptable to the user. For example, the temperature and/or humidity may be determined to be at acceptable levels if the outside temperature and the temperature setting for the property (e.g., the thermostat set point) match, if the outside conditions (e.g., the temperature) are above or below a threshold setting (e.g., a thermostat set point), or if the outside conditions are within a threshold range. In such instances, the notification 506 can be sent to the user, for example, through the interface 504, indicating that the user should deactivate the HVAC system for the property and instead open up any ventilation openings (e.g., windows) of the property instead to save energy. The interface 504 can also provide the user an option 508 to confirm that the user is going to open windows, patio doors, etc. When the user selects the option 508, the HVAC system can be disabled. Alternatively, the user can simply dismiss the notification 506 by selecting a close option 512.

Figure 5B:
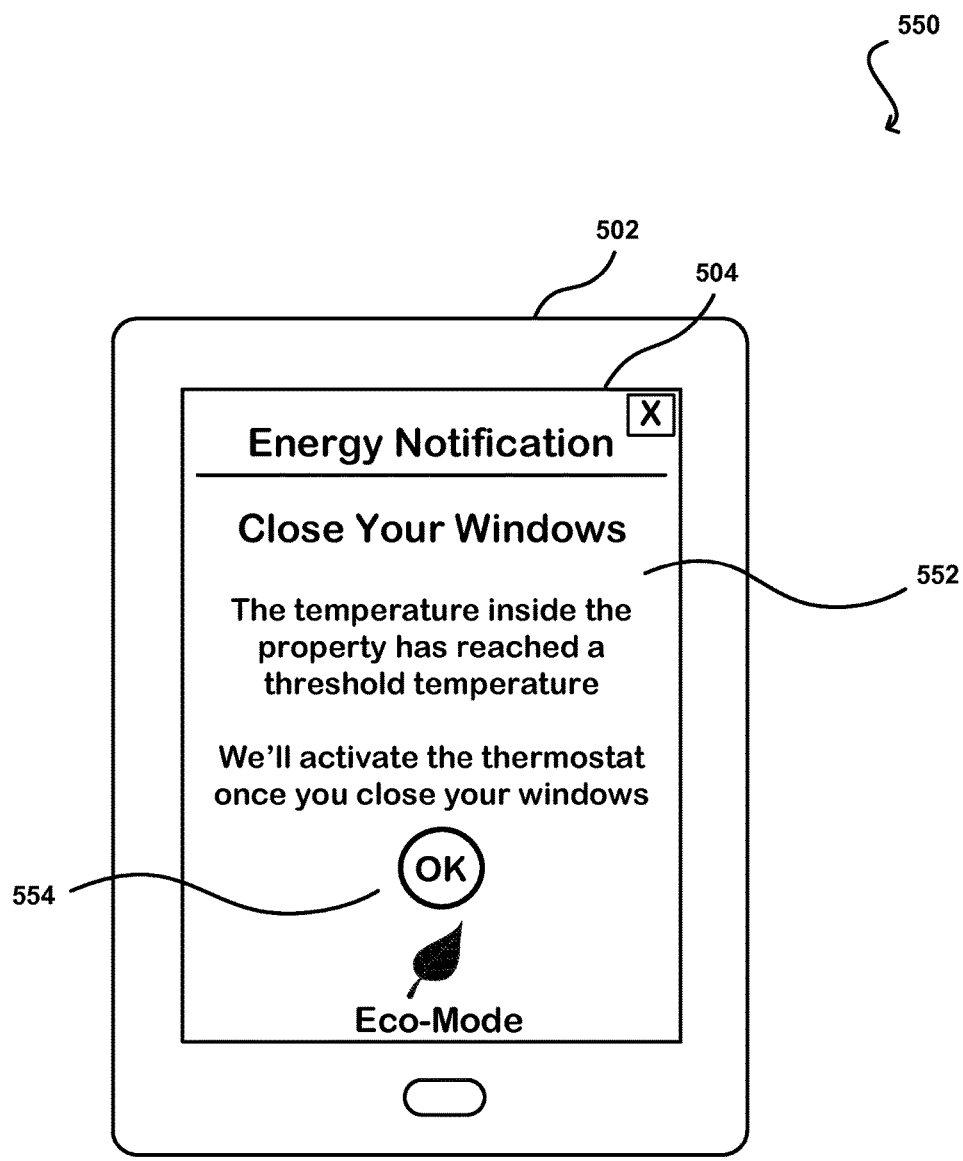

In some instances, rather than deactivating the HVAC system, the user can be provided with an option 510 that will place a temporary hold on the thermostat by setting thermostat so that the user's HVAC system will not be activated until the temperature within the property reaches a threshold temperature, as described above. For example, the user can set a threshold temperature of 72 degrees. If, after opening the windows, the temperature within the property rises to the threshold temperature, then the user can be provided with a subsequent notification 552, as illustrated in FIG. 5(b), describing the change in the property's temperature and confirming 554 that the user wants to activate the HVAC system and close any ventilation openings.

Figure 6:
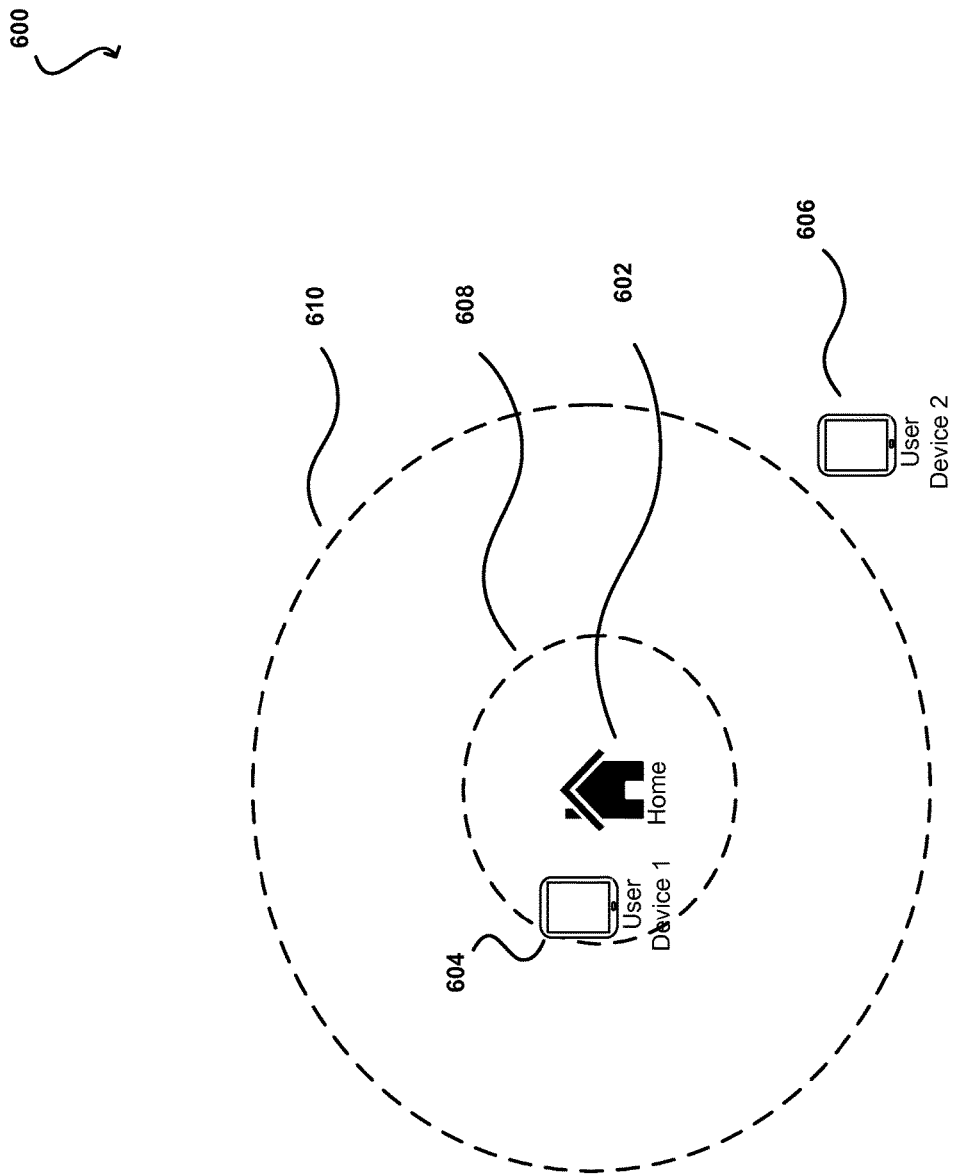
FIG. 6 illustrates an example approach for determining a device location for initiating various location-based modes on a thermostat.

FIG. 6 illustrates an example 600 approach for determining a user's location for initiating various location-based modes (e.g., away mode, vacation mode, etc.) on a thermostat. FIG. 6 illustrates a property 602 that includes at least one HVAC system and at least one corresponding thermostat. In FIG. 6, a first user device 604 and a second user device 606 have both been associated (e.g., enrolled or registered) with the property 602. As mentioned, a user can enroll any number of computing devices (e.g., mobile phones, tablets, other GPS-enabled devices, etc.) to be associated with the user's property, for example, through the thermostat or an energy management system, as described below.

Generally, a thermostat may be configured to use a location fencing system (e.g., geo-fence) to activate a setting or mode (e.g., auto away, vacation mode, adaptive recovery, etc.) on the thermostat when respective enrolled devices 604, 606 of one or more users are a certain distance away from the property 602. Users may be able to configure boundaries or distance radii (e.g., select a distance between 500 ft and 10 miles away) from the property to be used for activating and/or deactivating various settings or modes. For example, an away mode can be activated on the thermostat when the user is located 5 miles away from the property and the thermostat can be configured to begin cooling or warming the property in time for the user's arrival when the user is located 1 mile away from the property.

In some implementations, determining whether the devices 604, 606 are entering or exiting a geo-fence is based on tracking the devices, for example, using a Global Positioning System (GPS) to determine the geographic location of the devices at regular intervals, and to transmit coordinates referencing those geographic locations to a server. However, such an implementation raises privacy concerns as it transmits the geographic coordinates of locations at which the user's device has traveled. To alleviate such privacy concerns while still providing the feature of triggering various thermostat settings or modes using geo-fences, in some embodiments of the subject technology, each of the user devices 604, 606 can be configured to send a notification upon entering or exiting any pre-defined geofence 608, 610. For example, each device 604, 606 can have a software application running that is configured to determine when the respective device enters or exits a geo-fence 608, 610 (e.g., a predefined radius or boundary away from the thermostat location). When a determination is made that the device 608 has entered a geo-fence 608, the device 608 can send a notification, for example, to the thermostat at the property 602 or to a remote energy management system, indicating that the device 604 has entered the geo-fence 608 without disclosing more specific information about the device's geographic location (e.g., GPS coordinates). Similarly, when a determination is made that another device 606 associated with the property 602 has exited a geo-fence 610, the device 606 can send a notification, for example, to the thermostat associated with the property 602 or to the energy management system, indicating that the device 606 has exited the geo-fence 610 without disclosing any more specific information about the device's geographic location. Based on such notifications, the thermostat and/or the energy management system can determine which setting and/or thermostat mode to activate or deactivate. For example, an adaptive recovery program may be triggered when a notification is received from the device 604 indicating that the device 604 has entered the geo-fence 608. Since more than one device can be associated (e.g., enrolled) with the property 602, in some embodiments, some settings or modes may be configured to activate or deactivate when one or more of the devices (e.g., a subset or combination of devices) associated with the property has entered or exited a geo-fence. For example, assuming that both devices 604 and 606 are associated or enrolled with the property 602, a vacation mode can be activated on the thermostat for the property 602 when both devices 604 and 606 exit a specified geo-fence (e.g., 100 mile radius). By offloading such functionality to the energy management system, the amount of power drained from the devices, for example, to manage the thermostat, is reduced to zero or near zero.

As mentioned, different geo-fences (e.g., different radii or boundaries) can be used to determine different actions by the user. For example, a first geo-fence having a distance radius of one mile can be utilized for determining when the user is leaving the property. Further, a second geo-fence having a distance radius of half of a mile can be utilized for determining when the user is returning to the property. Similarly, different geo-fences (e.g., distance ranges, radii, boundaries, etc.) can be utilized depending on the mode or setting to be triggered. For example, for an away mode, a first geo-fence having a distance radius of one mile can be utilized for determining when the user is leaving the property and second geo-fence having a distance radius of half of a mile can be utilized for determining when the user is returning to the property. In another example, for a vacation mode, a first geo-fence having a distance radius of 100 miles can be utilized for determining when the user is leaving the property and second geo-fence having a distance radius of 10 miles can be utilized for determining when the user is returning to the property.

In some embodiments, notifications sent by the devices 604, 606 can include additional information such as a timestamp. In such embodiments, the time and date a notification is received, for example, by an energy management system or thermostat, may be stored and used to modify thermostat settings. Accordingly, the energy management system or thermostat may activate an energy-savings program (e.g., an away mode or a vacation mode) in certain embodiments, when the user is outside of a geo-fence for a certain amount of time. In some embodiments, instead of determining when the user's location exceeds a threshold distance from the property 602, the thermostat can be configured or instructed to enter an away mode when the user's location is within a certain area or near a location (e.g., a work location) of interest. Each area or location of interest can be associated with a corresponding geo-fence, as described above, for triggering various actions relating to the thermostat and/or any HVAC system controlled by the thermostat.

Figure 7:
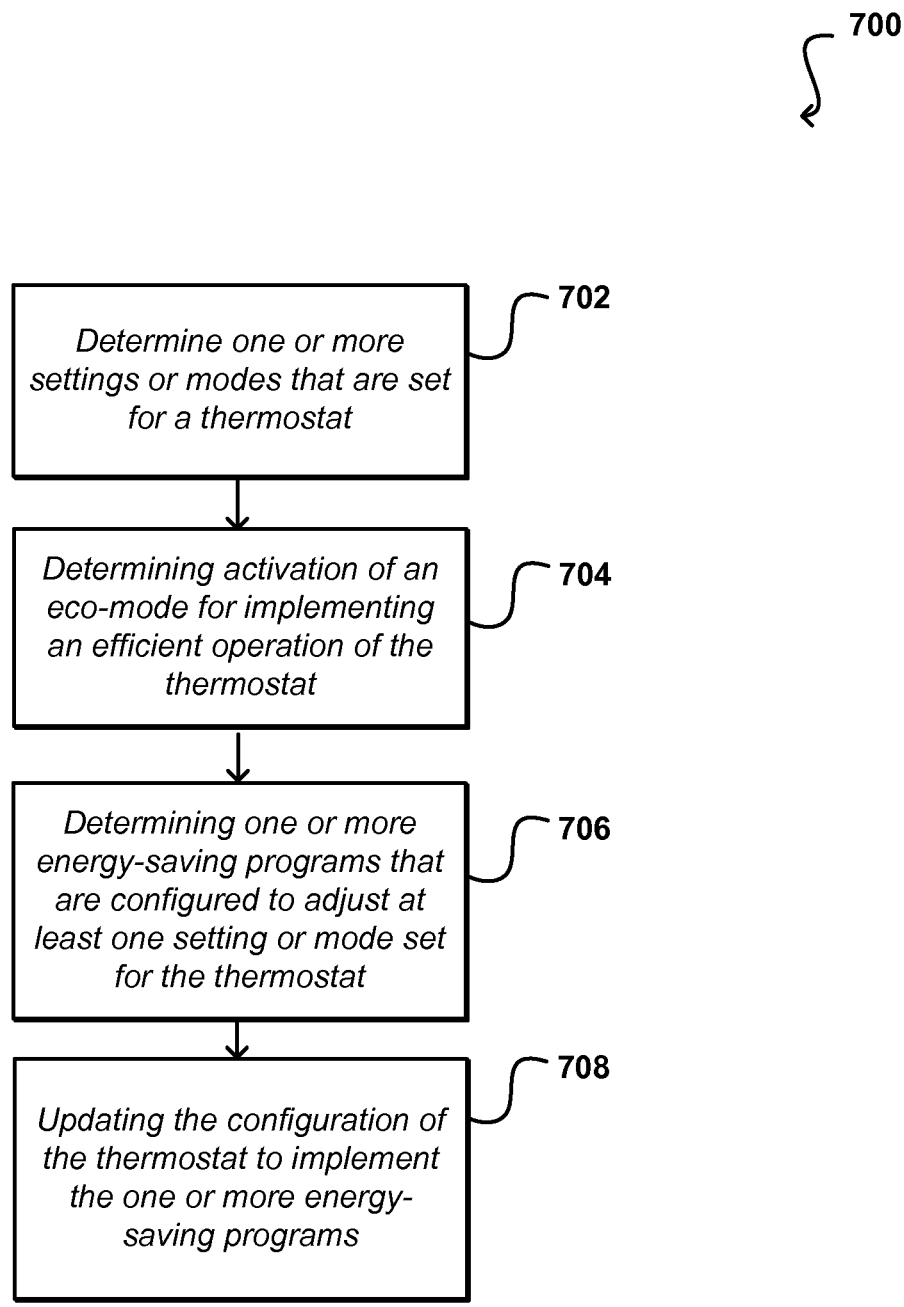
FIG. 7 illustrates an example process for initiating energy-saving programs associated with an eco-mode on a thermostat.

FIG. 7 illustrates an example process for initiating energy-saving programs associated with an eco-mode on a thermostat. The example process 700 is provided merely as an example and additional or fewer steps may be performed in similar or alternative orders, or in parallel, within the scope of the various embodiments described in this specification.

A computing device can determine 702 any settings or modes for a thermostat. For example, depending on the implementation, the computing device may be an energy management system configured to communicate with the thermostat via a network or the thermostat itself. The computing device can determine various temperature settings, schedules, and/or configuration options for such schedules and also modes, e.g., away modes or vacation modes. The computing device can determine 704 a selection of an eco-mode for implementing an efficient operation of the thermostat. For example, upon activating the eco-mode, the thermostat can be configured to activate various energy-saving programs that are configured to adjust various settings or configuration options for modes that are set on the thermostat. As described above, a user operating a mobile device can activate the eco-mode by selecting an option through a web interface, portal, or software running on the device. The device can send data describing the selection to the computing device to trigger the activation of such energy-saving programs.

The computing device can determine 706 any energy-savings programs to activate for the thermostat. In various implementations, a user can select or configure energy-savings programs that can or cannot be executed for the user's property. For example, a user can disable an energy-savings program that disables adaptive recovery on the user's thermostat. Next, the computing device can implement the energy-savings programs by updating 708 the configuration of the thermostat, as described above.

Figure 8:
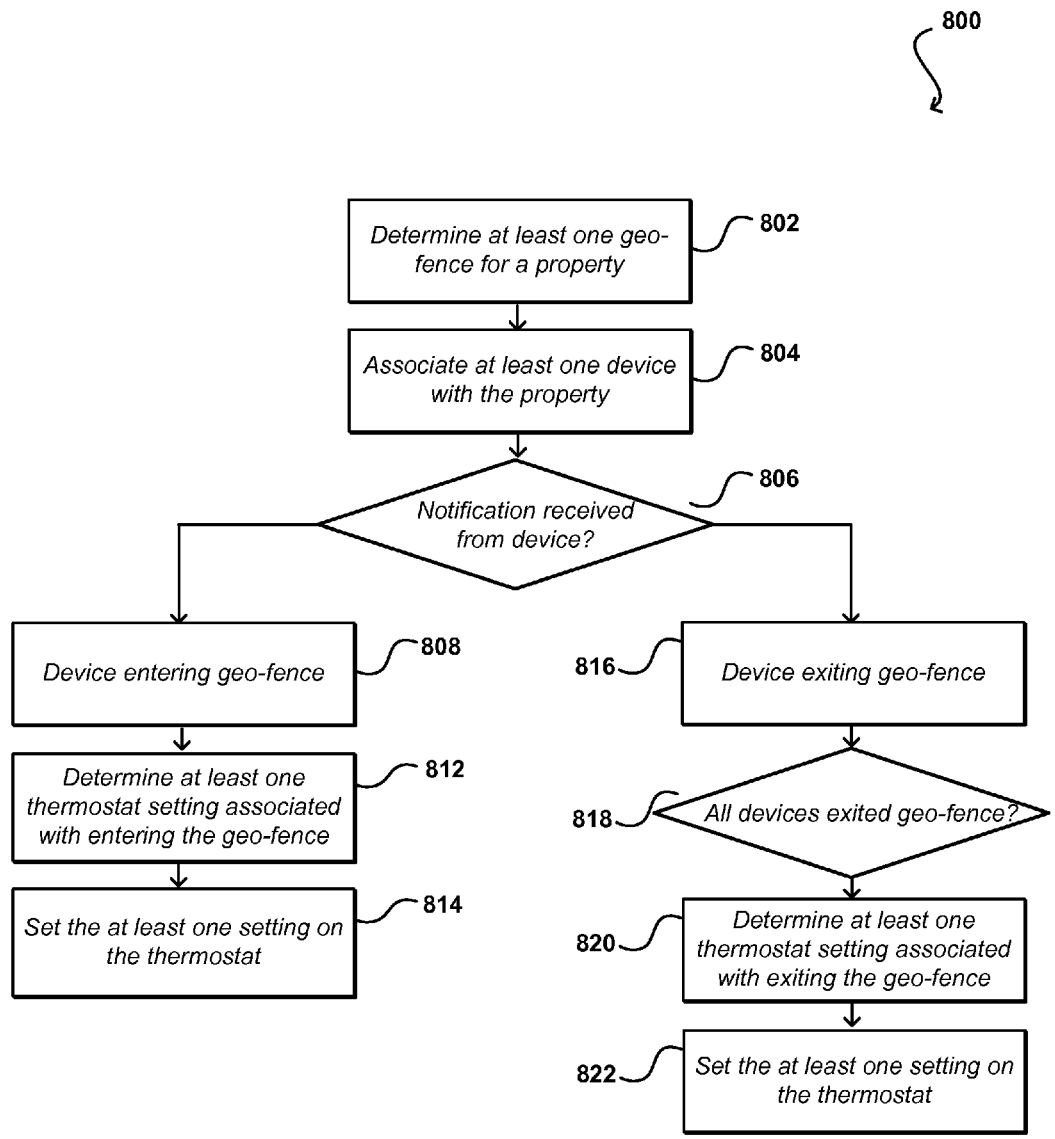
FIG. 8 illustrates an example process for determining a device location for initiating various location-based modes on a thermostat.

FIG. 8 illustrates an example process 800 for determining a device location for initiating various location-based modes on a thermostat. The example process 800 is provided merely as an example and additional or fewer steps may be performed in similar or alternative orders, or in parallel, within the scope of the various embodiments described in this specification.

Geo-fences can be determined 802 for a property. For example, geo-fences may be based on default values (e.g., default radius length) or be specified by a user of the property (e.g., a desired radius length or boundaries around a location). Further, as mentioned, different geo-fences can be assigned for different purposes. For example, a geo-fence of a 100 mile radius may be used to determine when a user is on vacation and a geo-fence of a one mile radius may be used to determine if the user is away from the property. Any number of computing devices may be associated 804 with the property. For example, each member in a family of four living in the property may associate one or more of their mobile devices with the property, for example, by enrolling the device with a smart thermostat of the property or through an energy management system. Such associations can be used to determine the locations of the users in relation to the property and determine whether to activate or deactivate any settings or modes on the thermostat based on those locations.

Each device can be configured to send a notification indicating whether the device has entered or exited a geo-fence and different actions can be taken depending on whether the user entered the geo-fence or exited the geo-fence (e.g., triggering an adaptive recovery mode versus an away mode). The notification can be received 806 by a computing device, for example, the thermostat or by the energy management system, as described below. The computing device can determine, based on the notification, that the device has entered or exited a geo-fence and which geo-fence. If the computing device determines that the device entered 808 a geo-fence, the computing device can determine 812 any thermostat settings that are triggered when a device enters the geo-fence. For example, the geo-fence may encompass the property and a device entering the geo-fence may indicate that the user of the device is on their way back to the property. The computing device can then set 814 the thermostat settings on the thermostat. In one example, the temperature for the property can be adjusted to a setting (e.g., a particular thermostat set point temperature, thermostat schedule, or status) that was specified by the user or an adaptive recovery mode can be triggered so that the thermostat begins pre-cooling or pre-heating the property.

If the computing device determines that the device exited 816 the geo-fence, in some implementations, the computing device can also determine 818 whether some combination or all of the other devices associated with the property have also exited the geo-fence. For example, such information may be needed when determining whether to activate vacation mode on the thermostat, since all devices associated with the property should be outside of some threshold distance from the property before a vacation temperature setting is implemented. The computing device can determine 820 any thermostat settings that are triggered when the device (or all of the devices) exits the geo-fence. The computing device can then set 822 the thermostat settings on the thermostat.

Figure 9:
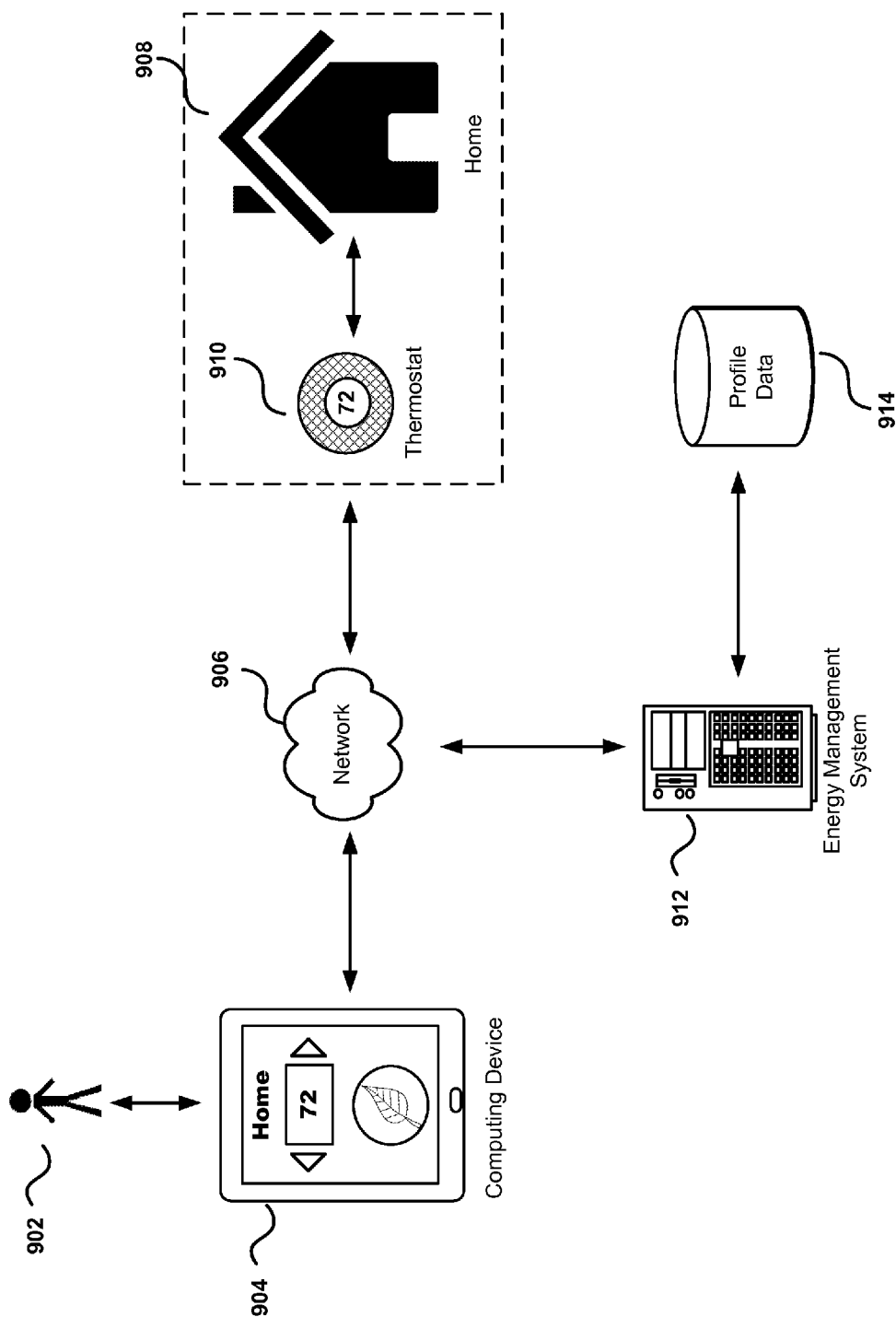
FIG. 9 illustrates an example of an environment for implementing aspects in accordance with various embodiments.

FIG. 9 illustrates an example environment 900 of an energy management system 902 in accordance with various embodiments. The example of FIG. 9 illustrates a user 902 interacting with the energy management system 902 through a client device 904 to register or enroll a thermostat 910 for a property 908.

The energy management system 902 can include at least one web server and at least one application server for performing the operations described herein. Further, the energy management system 908 can be implemented on one or more computers in one or more locations using one or more computer programs, in which the systems, components, and techniques described throughout this specification can be implemented. As used herein, a "property" may refer to any physical structure to which a commodity or energy is provided including, for example, electricity, water, natural gas, etc. Thus, a property may refer to, for example, a home, a building, business, point of interest, etc.

The client device 904 can interact with the energy management system 912 and/or the thermostat 910, for example, through a software application, e.g., web browser or application, executing on the client device 904. The client device 904 generally includes memory (e.g., random access memory), for storing instructions and data, and a processor for executing stored instructions. The client device 904 can be any appropriate device operable to send and receive requests, messages, or other types of information over the data communication network 906. The client device 904 can also include a display screen though which the user interacting with the client device 904 can view information (e.g., temperature settings of the thermostat 910, etc.) including any information sent to the device by the energy management system 912 and/or the thermostat 910 (e.g., notifications, etc.). Some examples of client devices include personal computers, smart thermostats, cellular phones, handheld messaging devices, laptop computers, set-top boxes, personal data assistants, electronic book readers, global positioning system (GPS) devices, vehicle components or devices, tablet devices, smartphones and the like.

The thermostat 910 can be connected to at least one HVAC system for the property. Further, the thermostat 910 can also be configured to access a network 906. The network 906 can include any appropriate network, including an intranet, the Internet, a cellular network, a local area network, a wide area network, or any other such network, or combination thereof. Protocols and components for communicating over such a network are well known and will not be discussed herein in detail. The client device 904 can communicate over the network 906 using wired or wireless connections, and combinations thereof.

When registering the thermostat 910 with the energy management system 912, the user 902 can specify, for example, through an interface presented on the device 904 or by interacting directly with the thermostat 910, information (e.g., geographic address) of the property 908 and any settings or modes that the user 902 wants to set for the thermostat 910. The user 902 can also enroll any devices 904 that the user 902 wants to associate with the property 908. Such enrollment may be performed by installing and configuring a software application on the device 904 that interacts with the energy management system 912 upon providing the user's credentials. Once logged into the user's account, the device 904 can be associated with a profile of the user or property that is stored in a data store 914 on the energy management system 912. The profile can be used to identify any devices 904 associated with the property 908, any temperature settings or modes preferred by the user 902 for the property 908, information identifying the thermostat 910 for the user's property 908, any geo-fences specified by the user 902, and other information describing the property 908 (e.g., geographic address). Further, the user 902 can also interact with the energy management system 912 and/or the thermostat 908 to specify any energy-saving modes that the user does not want to implement when the eco-mode option is selection, as well as any constraints or threshold settings for any of the energy-saving programs, as described above.

Further, the device 904 can be configured to send a notification or signal, through the network 906, to the energy management system 912 and/or the thermostat 910 any time the device 904 enters or exits a geo-fence. In some embodiments, the device 904 can access information describing any geo-fences associated with the property 908, for example, through the energy management system 912 and such information can be stored on the device 904. The device 904 can reference such information and positioning information of the device 904, for example as obtained from a GPS unit in the device 904, to determine when the device 904 enters or exits a specified geo-fence. In various embodiments, such information can be used by the energy management system 912 and/or the thermostat 910 to determine whether to activate or deactivate any settings and/or modes on the thermostat 910.

As mentioned, the user 902 can interact with the device 904 to select an eco-mode button to activate various energy-saving programs to be implemented on the thermostat 910. When the device 904 selects the eco-mode button, a notification can be sent to the energy management system 912 and/or the thermostat 910. Upon receiving the notification, the energy management system 912 can instruct the thermostat 910 to implement the energy-saving programs. In some implementations, the device 904 sends such notification directly to the thermostat 910 and the thermostat 910 implements the energy-saving programs. Similarly, the user 902 can interact with the device 904 to de-select the eco-mode option and, consequently, the energy-saving programs running on the thermostat 910 can be deactivated. According to other embodiments, the eco-mode button may be located on the thermostat 910 and activated by the user at the thermostat 910.

The thermostat 910 can interact with the energy management system 912 over the network 906 to provide updates on what settings and/or modes are set or active on the thermostat 910, as well as other information about the property 908 (e.g., ambient temperature). Similarly, the energy management system 912 can interact with the thermostat 910 over the network 906 to poll the thermostat 910 for any settings and/or modes that are set or active on the thermostat 910, as well as other information about the property 908 (e.g., ambient temperature, presence or non-presence of user activity, etc.) detected by the thermostat 910. Such information can be used to optimize the various energy-saving programs described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein. In some embodiments, the term "data store" refers to any device or combination of devices capable of storing, accessing, and retrieving data, which may include any combination and number of data servers, databases, data storage devices, and data storage media, in any standard, distributed, or clustered environment. The environment in one embodiment is a distributed computing environment including several computer systems and components that are interconnected through one or more communication links, using one or more computer networks or direct connections.

Figure 10:
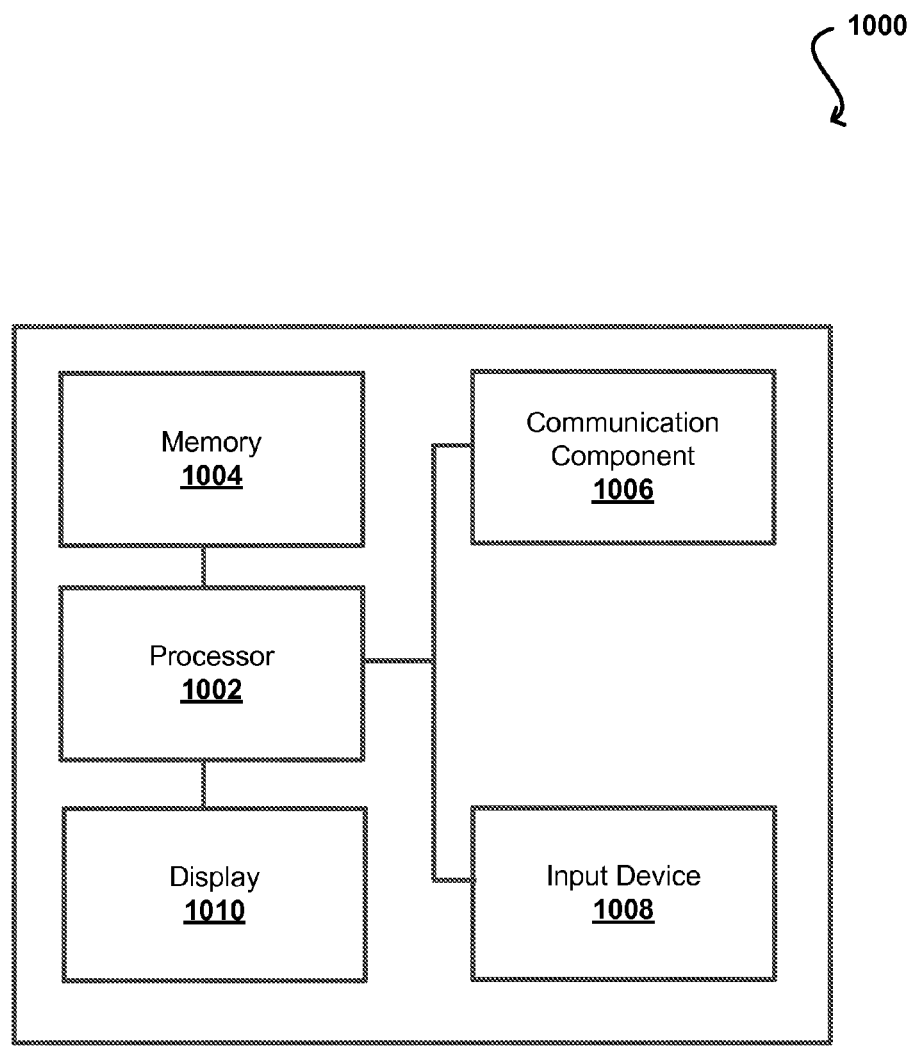
FIG. 10 illustrates an example configuration of components of a computing device.

FIG. 10 illustrates an example configuration of components of a computing device 1000, according to certain aspects of the subject technology. In this example, the computing device 1000 includes a processor 1002 for executing instructions that can be stored in a memory device or element 1004. The instructions may cause the computing device 1000 to execute computer-implemented methods and/or receive instructions. As would be apparent to one of ordinary skill in the art, the computing device 1000 can include many types of memory, data storage, or non-transitory computer-readable storage media, such as a first data storage for program instructions for execution by the processor 1002, a separate storage for usage history or user information, a removable memory for sharing information with other devices, etc. In some embodiments, the computing device 1000 can include one or more communication components 1006, such as a Wi-Fi, Bluetooth®, radio frequency, near-field communication, wired, or wireless communication system. The computing device 1000 in many embodiments can communicate with a network, such as the Internet, and may be able to communicate with other such devices. As discussed, the computing device 1000 in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The computing device 1000 includes some type of display element 1010, such as a touch screen or liquid crystal display (LCD).

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method performed by a computer comprising at least a processor, the method comprising:
    determining an operational configuration for at least one thermostat that controls at least one heating, ventilation, air conditioning (HVAC) system for a property;
    determining at least one energy-saving program to be implemented on the thermostat for reducing at least some energy consumption by the HVAC system;
    in response to determining that at least one resident of the property has exited a first geo-fence by at least a first distance away from the property, modifying, by at least the processor, the operational configuration for the thermostat based at least in part on the energy-saving program, the modifying comprising modifying a configuration for activation of an adaptive recovery program from (i) a first configuration that activates the adaptive recovery program at a time determined to enable reaching a specified temperature by a scheduled time to (ii) a second configuration that delays activation of the adaptive recovery program until a determination is made that one or more residents are in the property or within a threshold distance of the property;
    maintaining the operational configuration for the thermostat in the second configuration until determining that at least one of the residents have entered a second geo-fence by at least a second distance away from the property; and
    in response to determining that at least one of the residents have entered the second geo-fence by at least the second distance away from the property, wherein the second distance is less than the first distance, modifying the operational configuration for the thermostat from the second configuration to the first configuration, wherein the thermostat is configured to modify control of the HVAC system based at least in part on the energy-saving program.

2. The computer-implemented method of claim 1, wherein determining the operational configuration for at least one thermostat further comprises:
    receiving, from the thermostat, at least one temperature setting, schedule, or enabled mode for regulating a temperature setting on the thermostat, or
    obtaining, from the thermostat, at least one temperature setting, schedule, or enabled mode for regulating a temperature setting on the thermostat.

3. The computer-implemented method of claim 1, further comprising:
    receiving, from a user device, a selection of an option for activating an efficiency mode on the thermostat, the efficiency mode configured to activate the at least one energy-saving program, or
    determining a selection of an option on the thermostat for activating an efficiency mode on the thermostat, the efficiency mode configured to activate the at least one energy-saving program.

4. The computer-implemented method of claim 1, wherein determining the at least one energy-saving program further comprises:
    obtaining an efficient temperature setting that has been determined to be efficient for a geographic region in which the property is located, wherein a temperature setting of the thermostat is adjusted to the efficient temperature setting.

5. The computer-implemented method of claim 1, further comprising:
    responsive to determining that the residents of the property are outside of the first geo-fence for a threshold period of time:
        determining that the residents are likely on vacation; and
        sending, to a user device of at least one of the residents, a notification requesting confirmation that the residents are on vacation.

6. The computer-implemented method of claim 1, wherein determining the at least one energy-saving program further comprises:

determining at least one schedule for the thermostat for regulating a temperature setting over a period of time; and adjusting the temperature setting by a threshold amount, wherein the adjusted temperature setting reduces at least some energy consumption by the HVAC system over the period of time.

7. The computer-implemented method of claim 1, wherein determining the at least one energy-saving program further comprises:

determining at least one schedule for the thermostat for regulating a temperature setting over a period of time; and adjusting the period of time by a threshold amount, wherein at least some energy consumption by the HVAC system is reduced by the adjusted period of time.

8. The computer-implemented method of claim 1, further comprising:

determining a de-selection of the option for activating the efficiency mode for the thermostat; and modifying the operational configuration for the thermostat to deactivate the energy-saving program.

9. The computer-implemented method of claim 1, wherein modifying the operational configuration for the thermostat further comprises:

sending, to the thermostat, at least one instruction for modifying at least one of a schedule for regulating the temperature setting over a period of time or criteria for activating a mode for regulating the temperature setting on the thermostat.

10. A computing device for energy usage alerts, the computing device comprising:

at least one processor; and memory storing instructions that, when executed by the at least one processor, cause the computing device to perform operations of:

determining whether residents of a property are outside of a first geo-fence by at least a first distance away from the property for a threshold period of time, wherein the property has a thermostat controlling at least one heating, ventilation, and air conditioning (HVAC) system for the property;

responsive to determining that the residents of the property are outside of the first geo-fence for the threshold period of time:

determining that the residents are likely on vacation; and sending, to a user device of at least one of the residents, a notification requesting confirmation that the residents are on vacation;

in response to receiving, from the user device, the confirmation, adjusting operation of the thermostat from a first mode to a second mode based at least in part on the confirmation;

maintaining the operation of the thermostat in the second mode until determining that at least one condition for adjusting the operation of the thermostat of the property from the second mode to the first mode is satisfied; and in response to determining that at least one condition for adjusting the operation of the thermostat from the second mode to the first mode is satisfied based at least in part on a determination that at least one of the residents have entered a second geo-fence by at least a second distance away from the property, wherein the second distance is less than the first distance, modifying the operation of the thermostat from the second mode to the first mode.

11. The computing device of claim 10, wherein adjusting the operation of the thermostat based at least in part on the confirmation further causes the computing device to perform the operations of:

increasing a temperature of the thermostat.

12. The computing device of claim 10, wherein adjusting the operation of the thermostat based at least in part on the confirmation further causes the computing device to perform the operations of:

decreasing a temperature of the thermostat.

13. The computing device of claim 10, wherein adjusting the operation of the thermostat based at least in part on the confirmation further causes the computing device to perform the operations of:

enabling at least a vacation mode on the thermostat in response to receiving the confirmation from the user device, the vacation mode reducing at least some energy consumption by the HVAC system.

14. The computing device of claim 10, wherein the second mode is different than the first mode.

15. The computing device of claim 10, wherein the instructions further cause the computing device to perform the operations of:

sending, to the user device, a second notification requesting confirmation for disabling an adaptive recovery mode on the thermostat.

16. The computing device of claim 15, wherein the second notification includes an estimated cost for activating the adaptive recovery mode on the thermostat.

17. The computing device of claim 10, wherein adjusting the operation of the thermostat based at least in part on the confirmation further causes the computing device to perform the operations of:

disabling at least an adaptive recovery mode on the thermostat in response to receiving the confirmation from the user device, the disabling reducing at least some energy consumption by the HVAC system.

18. The computing device of claim 10, wherein the instructions further cause the computing device to perform the operations of:

determining, based on a temperature setting of the thermostat, that an outside temperature for a geographic region in which the property is located is within a threshold range of the temperature setting.

19. The computing device of claim 10, wherein the instructions further cause the computing device to perform the operations of:

sending, to the user device, a second notification requesting confirmation for adjusting a temperature setting of the thermostat, wherein the second notification indicates that an outside temperature for a geographic region in which the property is located is within a threshold range of the temperature setting of the thermostat.

20. A computer-implemented method performed by a computer comprising at least a processor, the method comprising:

maintaining an operation of a thermostat of a property in a first mode until determining that at least one condition for adjusting the operation of the thermostat of the property from the first mode to a second mode is satisfied;

in response to determining, by at least the processor, that the at least one condition for adjusting the operation of the thermostat of the property from the first mode to the second mode is satisfied based at least in part on a determination that a user has exited a first geo-fence by at least a first distance away from the property, wherein the thermostat controls at least one heating, ventilation, and air conditioning (HVAC) system for the property, modifying the operation of the thermostat from the first mode to the second mode;

maintaining the operation of the thermostat in the second mode until determining that at least one condition for adjusting the operation of the thermostat of the property from the second mode to the first mode is satisfied; and in response to determining that the at least one condition for adjusting the operation of the thermostat of the property from the second mode to the first mode is satisfied based at least in part on a determination that the user has entered a second geo-fence by at least a second distance away from the property, wherein the second distance is less than the first distance, modifying the operation of the thermostat from the second mode to the first mode, wherein the thermostat is configured to modify control of the HVAC system based at least in part on at least one of the second mode or the first mode.

21. The computer-implemented method of claim 20, wherein the second mode is different than the first mode.

22. The computer-implemented method of claim 20, wherein the second mode corresponds to a determination that the user has left or is leaving the property and the first mode corresponds to a determination that the user has returned or is returning to the property.

* * * * *